Dec. 17, 1929. P. SCHWARZ 1,739,524
STAMPING PROCESS FOR MAKING SHEET METAL ARTICLES
Filed Aug. 13, 1927  2 Sheets-Sheet 1

Philipp Schwarz
INVENTOR

By: Marks & Clerk
Attys

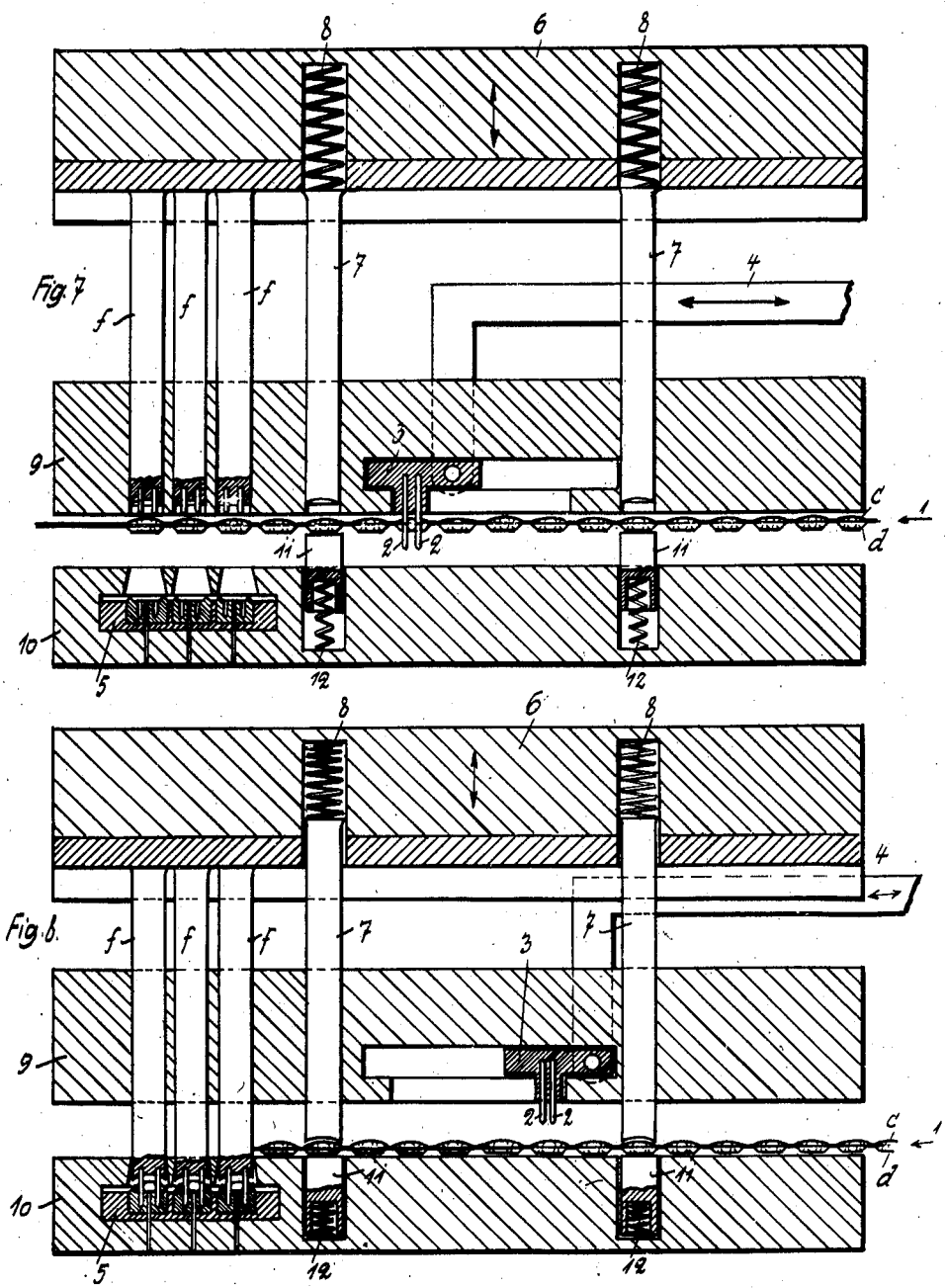

Patented Dec. 17, 1929.

1,739,524

UNITED STATES PATENT OFFICE

PHILIPP SCHWARZ, OF BARMEN, GERMANY

STAMPING PROCESS FOR MAKING SHEET-METAL ARTICLES

Application filed August 13, 1927, Serial No. 212,737, and in Germany August 18, 1926.

The invention relates to a stamping process for making sheet metal articles (e. g. metal buttons) having at least two stamped parts joined together, and to such articles themselves. The invention deals therefore with sheet metal objects which consist either of two stamped parts only, joined together or of two joined stamped parts in addition to other components. An example of the latter case is a three or four part sheet metal button consisting of two correspondingly formed sheet metal discs joined together and one or two other parts, e. g. a spring discs clamped between the discs.

According to the invention, two strips on which the parts for stamping have been previously formed and accurately superposed in rows or groups, are fed to a press and the two stamped parts to be joined are stamped out in one operation by a single punch; then by further travel of the punch and co-action of a counter-punch they are preliminarily or finally joined. This enables an uncommonly simple process and an equally simple apparatus to be employed, while at the same time the accuracy of the manufactured article is improved and the possibility of damage decreased.

The process is particularly simple if the stamping strips can simply be laid upon one another to bring all the previously formed parts for stamping on one strip accurately over the previously formed parts for stamping on the other, the two strips then being fed in common in the same direction to the stamping apparatus.

The process and the article are further explained with reference to an example illustrated in the accompanying drawing. The case chosen is the making of a two part button with two apertures.

Figure 1:
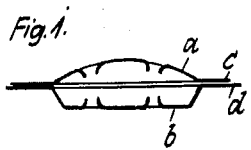
Figure 4:
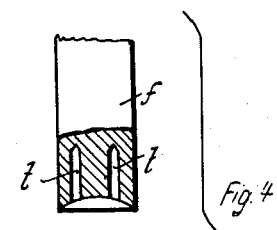
Figure 2:
Figure 3:
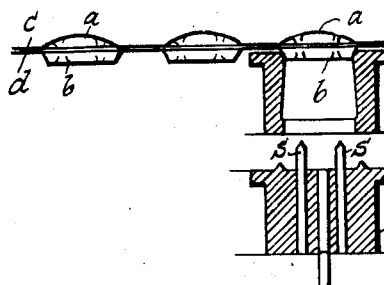
Figure 3:
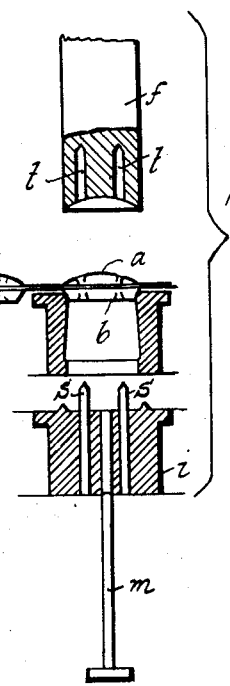
Figure 3:
Figure 5:
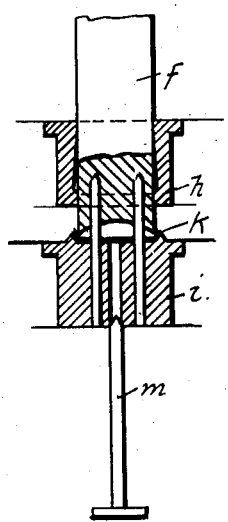
Figure 6:
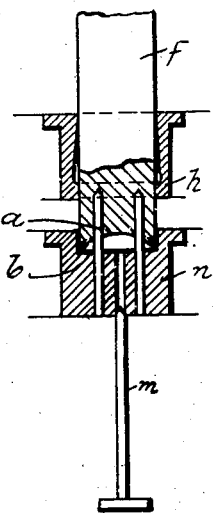

Figure 1 shows in longitudinal section on an enlarged scale the previously formed parts $a$ and $b$ for stamping of a button, portions of the strips $c$ and $d$ also being shown. Figure 2 shows the stamped parts $a$ and $b$ after preliminary joining and Figure 3 the stamped parts after final joining that is, the complete button, which it will be understood could contain other components inside. Figs. 4 and 5 show diagrammatically the position of the superposed strips with relation to the punch and die before and after the punching operation respectively; Fig. 6 shows a modified form of die; Figs. 7 and 8 show two positions of the press during the punching operation.

The case will first be considered where the two parts after being stamped out are to be joined preliminarily. The apparatus for this is shown in vertical section in different positions in Figures 4 and 5. All parts unnecessary for explanation of the invention are omitted.

The strip $c$ with the previously formed parts $a$ and the strip $d$ with the previously formed parts $b$ are closely superposed so that the parts $a$ of the one strip lie directly over the parts $b$ of the other strip in suitable position for joining. The manner in which the parts are previously formed is no part of the present invention. The diameter of the part $a$ is smaller than that of the part $b$. The strips are then fed under a row or group of cutting punches $f$. The punch $f$ has a diameter, which exactly conforms with the diameter of the curved part $b$, which is larger than the diameter of the part $a$. The curvature at the lower end of the punch $f$ is greater than the curvature of the part $a$. As the punch $f$ descends, it presses at the central part of its curvature against the central part of the curvature $a$ without touching with its cutting edge the strip $a$. In this manner the part $a$ will be pressed downwards and the material of the strip will be bent in on the edge of the curvature $a$. If the cutting edge of the punch $f$ then touches the strip $c$, the part $a$ will be pressed into the part $b$ in the form or shape as shown in Figure 2. The punch $f$ then cuts through the two strips so that the parts $a$ and $b$ are interposed as shown in Figure 2. When the punch $f$ advances further, it finally moves these interposed parts $a$ $b$ into the space formed by the rib $k$ on the head of the counter-punch $i$. The two parts $a$ and $b$ are now pressed firmly against each other, as shown in Figure 5, so that they are partially connected together. The preliminarily joined stamped parts are then ejected by an ejector m, while the punch f again rises and the strips c, d are fed forward a predetermined distance. The preliminarily joined stamped parts are then finally joined by other means in any suitable way by bending over the outstanding edges.

If this final joining is to be effected in the same apparatus in a single step, instead of the counter-punch i, a counter-punch n, Figure 6, having a somewhat different form in vertical section is used.

This counter-punch n has in its upper face a cylindrical pocket into which the punch f presses the punched out parts after they have left the hollow die h. Here the inclined rim of the lower stamped part b is first turned vertically up and even turned slightly inward, whereupon the sharp edge of the cutting punch f engages behind this rim and bends it over together with the rim of the upper stamped part a. The ejector m then ejects the completed beaded button.

The rods s shown in Figures 4, 5 and 6 are only guide rods which pass through the holes in the parts a and b and into guide holes t in the punch f and thus ensure that the two parts take the correct position during cutting and joining.

The process described results in the two stamped parts to be joined originally having the same diameter. In order to permit joining by bending the edge of one part over that of the other, the latter must first be reduced in diameter, which to a sufficient extent and within the operation of the process described can only be effected by bending over the rim to be enclosed (see Figures 1 to 3). Both stamped parts therefore have their edges beaded over providing security against relative rotation of the two parts, which would interfere later in sewing owing to the holes getting out of register. This kind of joint between the two stamped parts could be used in other manufacturing processes, and extends to all articles consisting of two stamped parts united along their edges.

Naturally it is very important in the stamping process for the strips to remain exactly in correct relative position during feeding forward. The usual feeding means are hardly sufficient for this. According to the invention in order to ensure the correct relative positions of the two strips during the feed, the feed is effected by at least one reciprocating carrier rod, which alternately enters and leaves two superposed holes in the strips.

Figures 7 and 8 show in vertical section the essential parts of the punching apparatus and the essential parts of such a feed device, in two different positions.

It should first be explained that this feeding device is particularly suitable for the simultaneous stamping out of several successive double parts, that is for the multiple feed distance involved thereby, since both strips are held in exactly the correct relative position during the feed movement and in consequence there can be no objection to a long feed stroke. In the drawing it is assumed that three successive double parts are to be stamped out simultaneously and the feed stroke is therefore three times the distance between adjacent buttons.

In these views, c and d are again the two superposed strips, which are intermittently fed forward in the direction of the arrow l. Carrier rods 2, 2, which are mounted on a slide 3 reciprocating in the feed device serve for this purpose. The slide is reciprocated by an angle bar 4. The means for effecting this motion can be of any desired kind (say an eccentric and lever) and are not shown in the drawing. The rods 2, 2, each pass through two superposed holes in the strips c, d. When, as assumed in the drawings, buttons with apertures are to be stamped, it is simplest to pass the rods 2 through the superposed sewing holes in the two strips. After the entry of the rods, the slide 3 is fed forward, so that the rods move the strips forward, and the rods then leave the holes and return with the backwardly moved slide 3, in order once more to enter holes in the strips located a stroke distance behind the first.

For further explanation reference is directed to Figure 8 which shows the final position of the stamping tools. The three punches f have each stamped an upper part and a lower part out of the strips c, d and have preliminarily joined them, as explained with reference to Figures 1 to 6. The preliminarily joined stamped parts rest on the slide 5, and after the punches have risen, are removed to receive a final joining operation.

On the press head 6, on which the punches f are mounted, plungers 7 are slidably carried under the action of springs 8. These plungers 7 which pass similarly to the punches f through the stationary guide plate 9, press from above on the two strips c, d while plungers 11 moving in the bed plate 10 under the action or springs 12, operate counter to the plungers 7.

When the punches f begin to rise, at first the strips are held against the bed plate 10 by the upper plungers 7. Then the plungers 11 press the strips c, d upwards, while the plungers 7 also move back, so that the strips c, d, are held suspended for a short time between the plungers 7 and 11 and are then raised. During this time two pairs of holes in the strips pass over the carrier rods 2 which take the position shown in Figure 8 so that they pass through the holes. In the uppermost position, the punches f and the plungers 7 no longer contact with the strips.

The slide 3 with the rods 2 is now moved to the left, so that it takes the position shown in Figure 7, at the same time feeding the strips $c, d$ forward by a stroke length corresponding to three successive pairs of parts and intermediate material. At the following stamping stroke the strips are again pushed down, so that the rods 2, 2, leave the holes and the slide 3 then returns to the right (Figure 8).

The same feed device can obviously be used when only a single or double stroke length or more than a triple stroke length is required. Naturally, also several pairs of parts side by side can be stamped out simultaneously, it being necessary to alter the feed device. The superposed holes engaged by the carrier rods can be provided at any desired part of the strips and if necessary may serve only for feeding purposes.

What I claim is:—

1. A stamping process for making sheet metal articles comprising two stamped parts joined at their edges, which consists in superposing two strips in which the parts to be punched have been previously formed, with the pairs of parts axially aligned relative to one another, then simultaneously stamping with a single punch a pair of superposed parts and then flanging the edges of both parts in the same direction by further travel of the same punch and co-action of a counterpunch.

2. In apparatus for simultaneously stamping pairs of superposed parts previously formed in sheet metal strips, said parts each being provided with apertures, said apertures being in superposed alignment, a feed device comprising a feed rod, means for reciprocating said rod longitudinally of the center lines of the strips and means for causing said rod to enter and leave the superposed holes in said strips.

3. In apparatus for simultaneously stamping pairs of superposed parts previously formed in sheet metal strips, said parts each being provided with apertures, said apertures being in superposed alinement, a press head, a press bed, a feed device comprising a feed rod adapted to engage said strips, means for reciprocating said rod longitudinally of the center lines of the strips, spring actuated plungers on the press head for pressing said strips downwards to disengage said rod, and spring actuated plungers in the press bed for pressing said strips upwards to reengage said rod.

4. In apparatus for simultaneously stamping pairs of superposed parts previously formed in sheet metal strips, said parts each being provided with apertures, said apertures being in superposed alinement, a press head, a press bed, a feed device comprising a reciprocating bar reciprocating in a fixed guide plate, a feed rod carried by said bar and adapted to engage said strips, spring actuated plungers in the press head for pressing said strips downwards to disengage said rod, and spring actuated plungers in the press bed for pressing said strips upwards to reengage said rod.

5. In apparatus for simultaneously stamping pairs of superposed parts previously formed in sheet metal strips, a punch, a hollow cutting die in line with said punch and means for turning the edges of both of the stamped out parts in the same direction, said means being in line with said punch and located on the opposite side of said die.

In testimony whereof I affix my signature.

PHILIPP SCHWARZ.